United States Patent Office 2,762,061
Patented Sept. 11, 1956

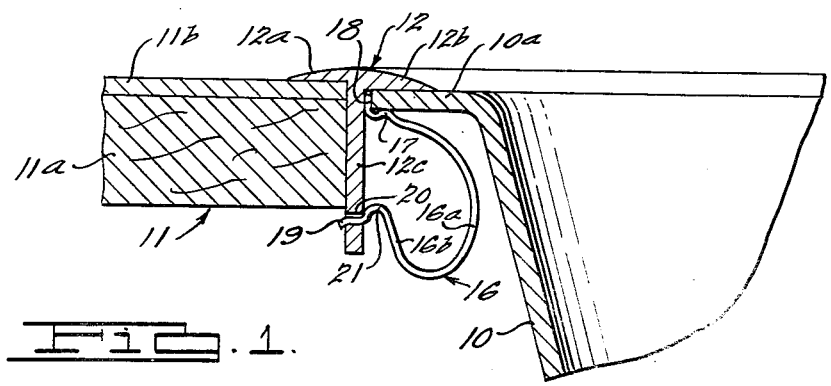
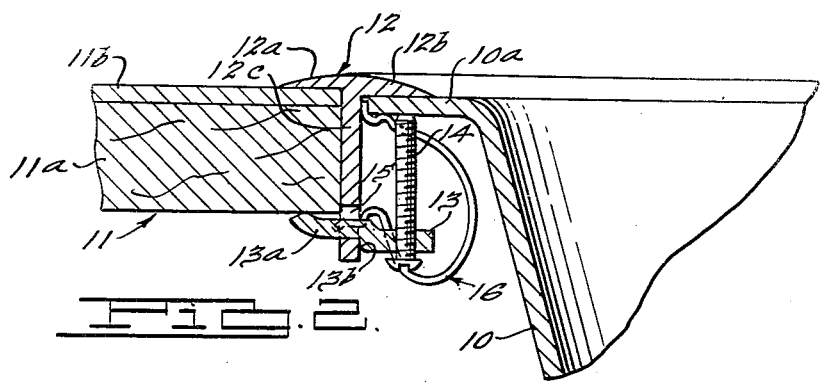
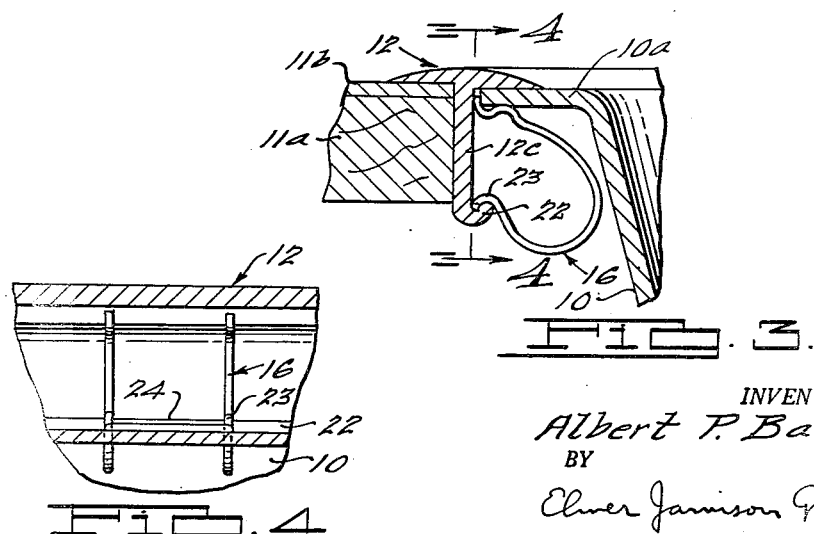

2,762,061

SINK ASSEMBLY

Albert P. Ball, Detroit, Mich., assignor to Briggs Manufacturing Co., Detroit, Mich., a corporation of Michigan Application June 18, 1953, Serial No. 362,464

12 Claims. (Cl. 4—187)

This invention relates to sink assemblies and more particularly to means for mounting a sink of the flat rim type within an opening in a drainboard, cabinet top or other supporting structure.

It is customary when installing a flat rim sink to cut out an opening of suitable dimensions in the flat top of the drainboard, cabinet top or the like to receive the bowl and rim of the sink, mounting means being provided for supporting the sink within the opening so that the flat marginal rim or flange of the sink will be approximately flush with the top of the drainboard. The gap between the edge of the rim and the edge of the cut-out opening is closed by means of a molding frame which is generally T-shaped in cross-section and which is tightly clamped in place to form a water-tight seal. Clamping devices are utilized for clamping the molding, sink rim and drainboard together to effect the desired seal. These devices may be of suitable kind such as disclosed in my Patent No. 2,502,553, dated April 4, 1950.

During installation of the sink it is desirable to assemble the T-shaped molding frame and sink together and support this assembly within the opening in the drainboard, cabinet top or the like preparatory to mounting the clamping devices in place and thereafter tightening them to clamp the molding frame and sink rim to the drainboard. An object of the present invention is to provide improved means for preliminarily supporting the sink and molding frame in position on the edge of the drainboard or the like so as to facilitate installation of the mounting members or clamping devices.

In accordance with the embodiment of the invention herein illustrated, by way of example, there are provided a suitable number of supporting devices adapted to support the sink rim on the T-shaped molding frame so as to enable the latter to be supported upon the marginal edge of the drainboard opening. Each device comprises a spring member which may be formed of spring wire or flat spring steel stock, this member being bent into an open loop or coil adapted to lie in the space beneath the sink rim. The upper end of this spring member is formed with a portion bearing against the underside of the edge of the sink rim and forming a rest or support for the rim. The lower end of the spring member is connected to a lower portion of the vertical leg of the molding frame, such as by inserting this end through a hole or slot in the molding frame or hooking it over a laterally projecting lug formation on the lower edge of the molding frame. The spring members are placed under substantial tension and when snapped into position provide a simple and efficient means for assembling the molding frame and sink together and supporting the sink rim on the vertical leg of the molding frame when the latter is mounted on the drainboard around the edge of the opening therein.

Other objects of this invention will appear in the following description and appended claims, reference being had to the accompanying drawings forming a part of this specification wherein like reference characters designate corresponding parts in the several views.

Fig. 1 is a fragmentary sectional elevation of a flat rim sink installed in an opening in a drainboard, cabinet top or the like and illustrating one of the spring devices for supporting the sink on the molding frame.

Fig. 2 is a view generally similar to Fig. 1 but additionally illustrating one of the clamping devices for the sink.

Fig. 3 is a view generally similar to Fig. 1 but illustrating a modification.

Fig. 4 is a fragmentary sectional view taken through lines 4—4 of Fig. 3 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a flat rim sink 10 installed within an opening in a cabinet top, drainboard or other supporting structure generally indicated at 11. The sink 10 is of any conventional type having the usual basin or bowl terminating around the upper marginal edge thereof in an outwardly extending continuous horizontal rim flange 10a. The drainboard or supporting structure 11 may comprise the usual supporting board 11a which may be of plywood or any other laminated structure usually covered by means of a sheet of linoleum or other material 11b which is bonded thereto. For the purpose of installing the sink 10 it is the usual practive to cut out a generally rectangular opening in the cabinet top or drainboard 11, which opening is somewhat larger than the sink so as to permit the latter to be inserted freely through the opening and also to accommodate a molding 12 which seals the joint between the marginal edge of the sink rim 10a and the adjacent edge of the opening in the drainboard or supporting structure 11.

The sealing molding 12 is preferably in the form of a generally rectangular frame having a configuration corresponding to the shape of the opening cut in the drainboard as well as the edge of the sink rim. This molding frame has an upper head comprising a flange portion 12a overlying the drainboard around the margin of the opening therein and a flange 12b overlapping the sink rim 10a. The molding frame is generally T-shaped in cross section and has a vertical leg 12c extending downwardly from the head, this leg being adapted to fit against the edge of the drainboard around the opening therein and projecting a suitable distance below the bottom of the drainboard. The molding frame 12 is formed of metal and not only serves as a sealing means but also provides an ornamental finish around the sink along the juncture of the sink rim and drainboard.

After installation of the sink 10 and molding frame 12 within the drainboard opening the molding frame is drawn down tightly so as to clamp the same and the sink rim to the drainboard. This clamping action may be accomplished by suitable means, and in Figs. 1 and 2 the clamping means therein illustrated is constructed in accordance with my above identified patent.

As illustrated in Fig. 2, each clamping device comprises a stamped metal clamping plate or piece 13 having a tapped hole adjacent one end thereof for the reception of a screw 14. The clamping member 13 has an end portion 13a which is insertable through a slot 15 adjacent the lower end of the vertical leg 12c of the molding frame. Intermediate its ends the clamping member 13 is formed with an offset portion providing a shoulder 13b engageable with the lower edge of the slot 15 and providing a stop for the proper positioning of the clamping member within the slot. When thus positioned, as illustrated in Fig. 2, the end 13a of the clamping member underlies the drainboard with the opposite end of the clamping member underlying the sink rim in vertically spaced relation thereto.

After the sink and molding frame have been installed and supported in position, as hereinafter described, the clamping devices are assembled in the slots in the vertical leg of the molding frame. The screw 14 is threaded through the tapped hole in each clamping device and is driven upwardly by means of a screw driver so as to engage the underside of the rim 10a. When the screw of each clamping device is tightened against the rim of the sink the underlying end of the clamping plate will be drawn down thereby forcing the end 13a thereof upwardly against the underside of the drainboard. This operation will result in drawing down the leg 12c of the molding frame and causing the flange portions 12a and 12b to engage tightly the upper surfaces of the drainboard and sink rim.

In accordance with the present invention means is provided for preliminarily supporting the sink 10 within the opening in the drainboard in position with respect to the molding frame 12 preparatory to installation of the clamping devices as above described. This supporting means comprises a number of spring devices adapted to support the sink rim on the vertical leg 12c of the molding frame so as to permit the sink and molding frame to be installed as a unit within the opening in the drainboard. Each supporting device comprises in the present instance a spring member 16 which may be formed of spring wire or flat spring steel stock. The spring stock is formed intermediate its ends into an open loop or coil portion 16a adapted to lie in the space beneath the sink rim and between the vertical leg of the molding frame and the adjacent wall of the sink bowl. The coil or loop portion 16a may be shaped as illustrated in the drawings with the upper portion thereof formed with an upwardly offset indentation 17 adapted to engage the underside of the sink rim adjacent the marginal edge thereof. The upper terminal end of the spring is provided with an upwardly bent portion 18 adapted to be inserted between the edge of the sink rim and the vertical leg of the molding frame, this construction enabling the upper end of the spring to be anchored in position. The lower portion of the spring coil is extended upwardly at 16b and thence is bent laterally to form an end portion or tongue 19 adapted to be inserted in an aperture or slot 20 near the lower end of the molding frame. Each spring device 16 is readily installed by first inserting the upper end 18 in position as illustrated and thereafter forcing the lower portion of the spring loop or coil upwardly under tension until the end 19 of the spring snaps into the slot or aperture 20 in the lower end of the vertical leg of the molding frame. The spring member has an offset portion 21 providing a shoulder engageable with the upper edge of the slot 20 so as to limit the distance the tongue 19 projects into the slot. Since the spring devices 16, when installed, are placed under substantial tension they will adequately serve to support the sink on the molding frame and provide an assembly which may be installed as a unit within the opening in the drainboard with the flange 12a resting upon the edge of the drainboard. Thereafter the clamping devices 13, 14 may be readily installed, as above described, and tightened so as to clamp the molding in place.

Figs. 3 and 4 illustrate a modified method of connecting the spring supporting devices 16 to the vertical leg 12c of the molding frame 12. In this embodiment the spring clips or devices 16 are formed of spring wire whereas in the previous embodiment they are preferably formed of spring sheet metal. In this embodiment the leg 12c of the molding frame terminates at its lower edge in a laterally projecting lug or flange formation 22 which is preferably hook-like. The lower end of each spring member or clip is in the form of a hook 23 which is adapted to be snapped into position to hook over the lug or flange portion 22. If desired the wire clips may be joined together in pairs, as by means of a wire bar 24 welded at opposite ends to a pair of clips as illustrated in Fig. 4. As in the previous embodiment the opposite ends of the spring device 16 in Figs. 3 and 4 will be firmly anchored in position under the tension exerted by the spring which will serve to support the sink rim on the molding preparatory to clamping the molding frame, sink rim and drainboard together. It will be understood that any suitable clamping devices may be utilized for this purpose.

I claim:

1. Means for mounting a flat rim sink in an opening in a supporting structure, comprising a molding frame having a top portion adapted to overlie adjacent edges of the sink rim and supporting structure and a vertical portion adapted to extend therebetween, and means for supporting the sink on said molding frame including a yieldable device in the form of an open loop having a lower end portion adapted to be connected to said vertical portion of the molding frame and an upper end portion adapted to engage the underside of the sink rim in supporting relation thereto.

2. Means for mounting a flat rim sink in an opening in a supporting structure, comprising a molding frame having a top portion adapted to overlie adjacent edges of the sink rim and supporting structure and a vertical portion adapted to extend therebetween, and means for supporting the sink on said molding frame including a spring device having an upper end portion providing a supporting seat for the sink rim and a lower end portion insertable under tension in an aperture in the vertical portion of the molding frame.

3. Means for mounting a flat rim sink in an opening in a supporting structure, comprising a molding frame having a top portion adapted to overlie adjacent edges of the sink rim and supporting structure and a vertical portion adapted to extend therebetween, and means for supporting the sink on said molding frame including a spring device having an upper end portion providing a supporting seat for the sink rim and a lower hook-like end portion adapted to be hooked under tension over a projection on said vertical portion of the molding frame.

4. Means for mounting a flat rim sink in an opening in a supporting structure, comprising a molding frame having a top portion adapted to overlie adjacent edges of the sink rim and supporting structure and a vertical portion adapted to extend therebetween, and a plurality of resilient members for supporting the sink on said molding frame, each member comprising a spring coil portion having an upper generally horizontal portion engageable with the underside of the sink rim and a lower laterally extending portion adapted to be connected under tension to the vertical portion of said molding frame.

5. Means for mounting a flat rim sink in an opening in a supporting structure, comprising a molding frame having a top portion adapted to overlie adjacent edges of the sink rim and supporting structure and a vertical portion adapted to extend therebetween, and means for supporting the sink on said molding frame including a spring device having an open coil portion terminating in an upward projection insertable between the edge of the sink rim and said molding frame, said coil portion having a lower laterally extending portion adapted to be connected under tension to the vertical portion of said molding frame.

6. Means for mounting a flat rim sink in an opening in a supporting structure, comprising a molding frame having a top portion adapted to overlie adjacent edges of the sink rim and supporting structure and a vertical portion adapted to extend therebetween, and means for supporting the sink on said molding frame including a spring device having an open coil portion terminating in an upward projection insertable between the edge of the sink rim and said molding frame, said coil portion having a lower laterally extending portion insertable under tension into an aperture in the vertical portion of said molding frame, said laterally extending portion being formed with a shoulder adapted to abut the edge of said aperture.

7. Means for mounting a flat rim sink in an opening in a supporting structure, comprising a molding frame having a top portion adapted to overlie adjacent edges of the sink rim and supporting structure and a vertical portion adapted to extend therebetween, and means for supporting the sink on said molding frame including a yieldable device having a spring portion adapted to be tensioned to attach a part thereof to said vertical portion of the molding frame and to dispose a second part thereof in engagement with the underside of the sink rim in supporting relation thereto.

8. Means for mounting a flat rim sink in an opening in a supporting structure, comprising a molding frame having a top portion adapted to overlie adjacent edges of the sink rim and supporting structure and a vertical portion adapted to extend therebetween, and a plurality of spring members for supporting said sink on said vertical portion of the molding frame, each spring member being adapted to be tensioned when installing the same to cause a portion thereof to engage the underside of the sink rim and a portion thereof to be connected to said vertical portion.

9. Means for mounting a flat rim sink in an opening in a supporting structure, comprising a molding frame having a top portion adapted to overlie adjacent edges of the sink rim and supporting structure and a vertical portion adapted to extend therebetween, and spring means adapted to be tensioned when installing the same to dispose spaced portions thereof in engagement respectively with the underside of the sink rim and said vertical portion for supporting the sink on said molding frame and when said sink and frame are assembled in said opening with the sink rim supported on the edge of the supporting structure.

10. Means for mounting a flat rim sink in an opening in a supporting structure, comprising a generally T-shaped molding frame having a top portion adapted to overlie adjacent edges of the sink rim and supporting structure and a vertical portion adapted to extend therebetween, a plurality of resilient members, each member being bent from a length of spring metal to provide an open loop portion having an upper end portion bent to provide a supporting seat for the sink rim and a lower end portion bent for connection under tension to the vertical portion of the molding frame.

11. Means for mounting a flat rim sink in an opening in a supporting structure, comprising a generally T-shaped molding frame having a top portion adapted to overlie adjacent edges of the sink rim and supporting structure and a vertical portion adapted to extend therebetween, a plurality of resilient members, each member being formed from a length of spring metal to provide an open loop portion having an upper end portion bent to provide a supporting seat for the sink rim and a lower end portion bent for insertion under tension in an aperture in the vertical portion of the molding frame.

12. Means for mounting a flat rim sink in an opening in a supporting structure, comprising a generally T-shaped molding frame having a top portion adapted to overlie adjacent edges of the sink rim and supporting structure and a vertical portion adapted to extend therebetween, a plurality of resilient members, each member being formed from a length of spring metal to provide an open loop portion having one end portion bent to provide a supporting seat for the sink rim and another end portion bent to provide a hook engageable under tension over a projecting part of the vertical portion of said molding frame.

References Cited in the file of this patent

UNITED STATES PATENTS

| Number | Name | Date |
| --- | --- | --- |
| 1,427,836 | Morris | Sept. 5, 1922 |
| 2,158,467 | Madsen | May 16, 1939 |
| 2,503,910 | Kerby | Apr. 11, 1950 |
| 2,503,982 | Willis | Apr. 11, 1950 |
| 2,627,609 | Drain | Feb. 10, 1953 |